US009363352B2

(12) United States Patent
Yew et al.

(10) Patent No.: US 9,363,352 B2
(45) Date of Patent: *Jun. 7, 2016

(54) DUPLEX AUDIO FOR MOBILE COMMUNICATION DEVICE AND ACCESSORY

(75) Inventors: Jason J. Yew, Cupertino, CA (US); Lawrence G. Bolton, Fremont, CA (US)

(73) Assignee: Apple Inc., Cupertino, CA (US)

(*) Notice: Subject to any disclaimer, the term of this patent is extended or adjusted under 35 U.S.C. 154(b) by 948 days.

This patent is subject to a terminal disclaimer.

(21) Appl. No.: 13/424,096

(22) Filed: Mar. 19, 2012

(65) Prior Publication Data

US 2012/0320807 A1 Dec. 20, 2012

Related U.S. Application Data

(63) Continuation of application No. 12/399,740, filed on Mar. 6, 2009, now Pat. No. 8,140,116.

(51) Int. Cl.
*H04B 1/38* (2015.01)
*H04M 1/725* (2006.01)
*H04R 3/02* (2006.01)

(52) U.S. Cl.
CPC ...... *H04M 1/72527* (2013.01); *H04M 1/72558* (2013.01); *H04R 3/02* (2013.01); *H04R 2205/021* (2013.01); *H04R 2499/11* (2013.01)

(58) Field of Classification Search
None
See application file for complete search history.

(56) References Cited

U.S. PATENT DOCUMENTS

| 5,692,038 | A | 11/1997 | Kraus et al. |
|---|---|---|---|
| 5,881,370 | A | 3/1999 | Pottala et al. |
| 5,974,333 | A | 10/1999 | Chen |
| 5,991,640 | A | 11/1999 | Lilja et al. |
| 6,081,724 | A | 6/2000 | Wilson |
| 6,148,205 | A | 11/2000 | Cotton |
| 6,167,251 | A | 12/2000 | Segal et al. |
| 6,377,825 | B1 | 4/2002 | Kennedy et al. |
| 6,546,262 | B1 | 4/2003 | Freadman |
| 6,766,175 | B2 | 7/2004 | Uchiyama |
| 6,926,130 | B2 | 8/2005 | Skowronski |
| 7,054,423 | B2 | 5/2006 | Nebiker et al. |
| 7,110,789 | B1 | 9/2006 | Curtiss et al. |
| 7,424,312 | B2 | 9/2008 | Pinder et al. |
| 8,036,641 | B2 | 10/2011 | Hovestadt et al. |
| 8,060,014 | B2 | 11/2011 | Ueda et al. |
| 8,117,651 | B2 | 2/2012 | Novotney et al. |
| 2005/0233778 | A1 | 10/2005 | Rodman et al. |
| 2009/0011794 | A1* | 1/2009 | Seo ............................. 455/557 |
| 2010/0190438 | A1* | 7/2010 | Chen ........................... 455/41.2 |
| 2010/0227631 | A1 | 9/2010 | Bolton et al. |

* cited by examiner

*Primary Examiner* — Anh Tran
(74) *Attorney, Agent, or Firm* — Blakely, Sokoloff, Taylor & Zafman LLP

(57) ABSTRACT

Duplex audio is provided for a mobile communication device and an accessory. In some embodiments, the accessory can selectably operate in a duplex audio mode, concurrently sending audio to and receiving audio from the mobile communication device, or in another audio mode. In duplex audio mode, the accessory can enable its internal audio processing operations (e.g., echo cancellation) while the mobile communication device disables its corresponding internal operations or vice versa. The mobile communication device can control when the accessory transitions into and/or out of duplex audio mode.

16 Claims, 7 Drawing Sheets

DUPLEX AUDIO FOR MOBILE COMMUNICATION DEVICE AND ACCESSORY

BACKGROUND

The present disclosure relates in general to mobile communication devices that interoperate with accessories and in particular to interoperation of a mobile communication device with an accessory to provide a duplex audio mode.

Mobile communication devices, such as cellular phones, have become nearly ubiquitous. Some mobile communication devices, such as the iPhone™ (made by Apple Inc., assignee of the present application), can provide users a variety of services in addition to mobile telephone service; such services can include management and playback of media content (music, videos, audiobooks, photos, etc.); storage of personal data such as calendar, contacts, and notes; Internet access; and the ability to execute various application programs that the user may choose to download and install.

Some mobile communication devices are designed to interoperate with various accessory devices (also referred to herein as accessories). For example, a mobile communication device can have a connector with a number of pins that support providing audio and/or video to an accessory, receiving audio and/or video from an accessory, providing serial communication to and/or from the accessory, providing power to and/or receiving power from the accessory, and so on. This connector can be docked or mated with a corresponding connector of an accessory, thereby allowing the exchange of various signals and data between the portable communication device and the accessory.

Accessories can provide a number of different services or service enhancements in connection with a mobile communication device. For example, some accessories may include speakers to play audio content received from the mobile communication device and/or video display screens to display video content received from the mobile communication device. Some accessories may include a microphone and may provide audio input from the microphone to the mobile communication device, e.g., allowing the mobile communication device to act as a voice recorder. Some accessories may include video and/or still image cameras and may provide video and/or image data to the mobile communication device for storage and/or playback.

SUMMARY

Certain embodiments of the present invention relate to providing duplex audio operation between an accessory and a mobile communication device. The mobile communication device in some embodiments has a built-in speaker and microphone, allowing the device to be used as a telephone handset, voice recorder, audio player, or the like. The mobile communication device can incorporate echo cancellation processing between the built-in speaker and microphone. For example, to the extent that the built-in microphone picks up sounds emanating from the built-in speaker, the mobile communication device can cancel this contribution to the microphone signal, thus providing a cleaner sound experience. Some mobile communication devices are designed to automatically perform echo cancellation during a phone call or at other times when sound is concurrently being produced by the device's speaker and detected by the device's microphone.

However, when the mobile communication device is docked with an external speaker, it can be more difficult for the mobile communication device to accurately perform echo cancellation, as the mobile communication device may lack information as to the audio characteristics of the external speaker (e.g., whether and how long any processing delay within the speaker might be). And in cases where the mobile communication device is also receiving audio input from an external source, the difficulty of accurate echo cancellation is increased. Further, an external device that has both its own speaker and microphone might perform its own echo cancellation, in which case it would not be desirable for the mobile communication device to duplicate the echo cancellation.

Certain embodiments of the present invention provide improved interoperability of a mobile communication device with a speaker accessory, including echo cancellation. In one embodiment, when a mobile communication device that is docked with a speaker accessory detects the beginning of a phone call (e.g., when a call is received or placed), it can notify the speaker accessory and disable its own internal echo cancellation operations. The speaker accessory, which can also have a microphone, can enable its echo cancellation operations, providing clear audio to the parties to the call.

In other embodiments, the coordination of echo cancellation between the mobile communication device and the accessory can be applied in phone calls as well as other situations. For example, a number of situations can arise where an accessory is receiving audio signals from the mobile communication device and concurrently delivering audio signals to the mobile communication device, sometimes referred to herein as a "duplex" audio mode. In any such situation, the mobile communication device and the accessory can coordinate the responsibility for various audio processing operations, such as echo cancellation. In one embodiment, the mobile communication device can signal to the accessory to indicate when the accessory should enter or exit duplex audio mode. When in duplex audio mode, the accessory can enable its internal audio processing operations (e.g., echo cancellation) while the mobile communication device disables its corresponding internal operations (or vice versa). When the accessory transitions to a mode other than duplex, the mobile communication device can re-enable its own internal audio processing operations and the accessory can disable its corresponding internal operations.

In further embodiments, the accessory may provide user input controls allowing the user to remotely operate the phone functionality of the mobile communication device. For example, the accessory may be able to instruct the mobile communication device to answer or disconnect a call, to place a call to a selected number, to display voice mail notifications or content, or the like.

The following detailed description together with the accompanying drawings will provide a better understanding of the nature and advantages of the present invention.

DETAILED DESCRIPTION

Certain embodiments of the present invention provide improved interoperability of a mobile communication device with a speaker accessory, including echo cancellation. In one embodiment, when a mobile communication device that is docked with a speaker accessory detects the beginning of a phone call (e.g., when a call is received or placed), it can notify the speaker accessory and disable its own internal echo cancellation operations. The speaker accessory, which can also have a microphone, can enable its echo cancellation operations, providing clear audio to the parties to the call.

In other embodiments, the coordination of echo cancellation between the mobile communication device and the accessory can be applied in phone calls as well as other situations. For example, a number of situations can arise where an accessory is receiving audio signals from the mobile communication device and concurrently delivering audio signals to the mobile communication device, sometimes referred to herein as a "duplex" audio mode. In any such situation, the mobile communication device and the accessory can coordinate the responsibility for various audio processing operations, such as echo cancellation. In one embodiment, the mobile communication device can signal to the accessory to indicate when the accessory should enter or exit duplex audio mode. When in duplex audio mode, the accessory can enable its internal audio processing operations (e.g., echo cancellation) while the mobile communication device disables its corresponding internal operations (or vice versa). When the accessory transitions to a mode other than duplex, the mobile communication device can re-enable its own internal audio processing operations and the accessory can disable its corresponding internal operations.

In further embodiments, the accessory may provide user input controls allowing the user to remotely operate the phone functionality of the mobile communication device. For example, the accessory may be able to instruct the mobile communication device to answer or disconnect a call, to place a call to a selected number, to display voice mail notifications or content, or the like.

Figure 1:
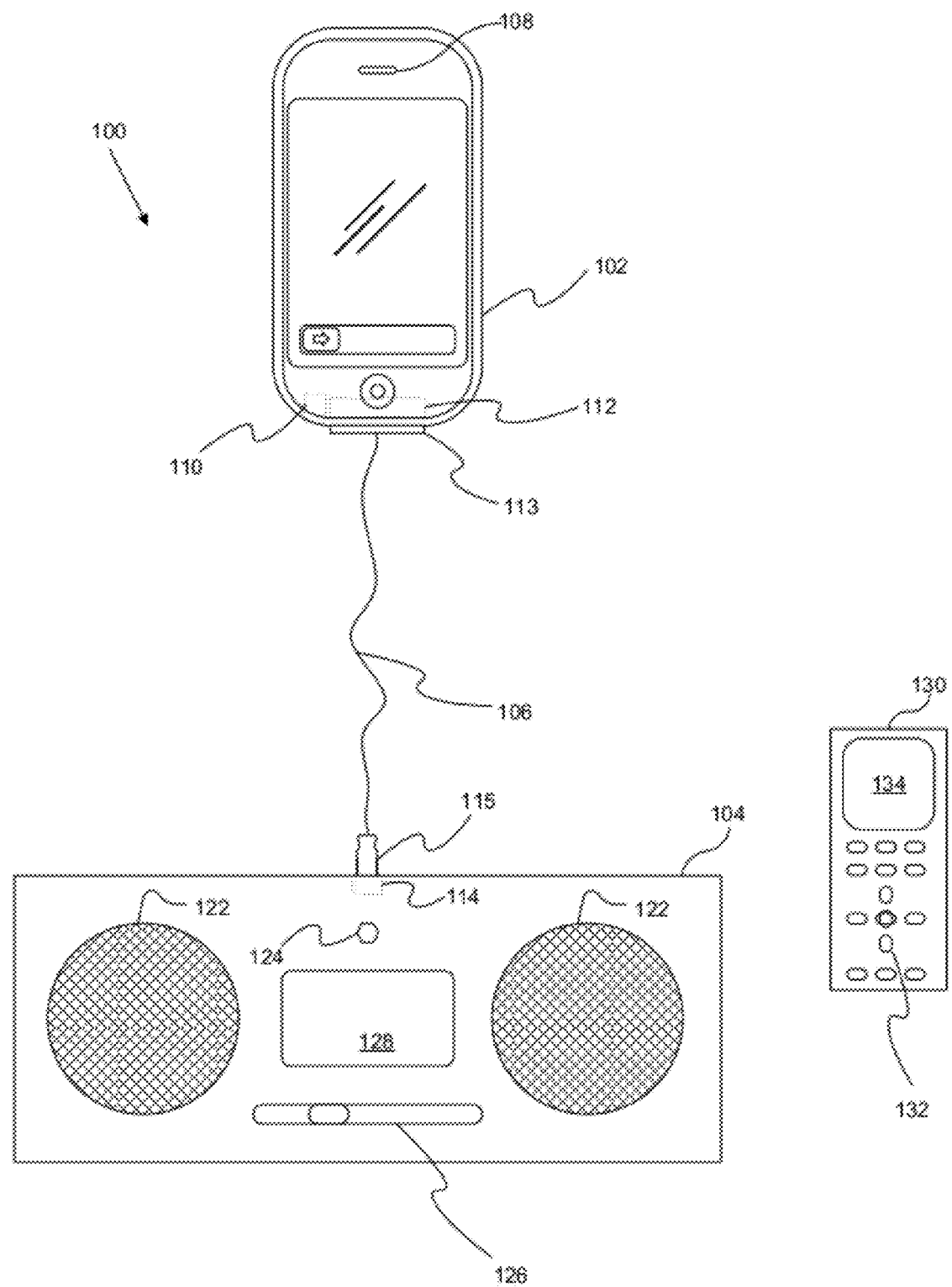
FIG. 1 is a simplified illustration of a system according to an embodiment of the present invention.

FIG. 1 is a simplified illustration of a system 100 according to an embodiment of the present invention. System 100 includes a mobile communication device 102 that can be connected to an accessory 104 via a cable 106. In one embodiment, mobile communication device 102 can be an iPhone™; other mobile communication devices can also be used. Mobile communication device 102 can include a built-in speaker 108 and a built-in microphone 110. Built-in speaker 108 can produce audible sound in response to a suitable electrical signal, and built-in microphone 110 can generate electrical signals in response to incident sound waves. Mobile communication device 102 can also provide a user interface such as touch-screen display 112, allowing a user to control mobile communication device 102.

Mobile communication device 102 can support a variety of operations including placing and/or receiving telephone calls, e.g., by communicating with a conventional cellular telephone network, other mobile telephone network, or a data network such as the Internet (e.g., using voice-over-IP technology). During a telephone call, mobile communication device 102 can deliver sounds to the user via speaker 108 and can receive sounds from the user via microphone 110. Mobile device 102 can implement various audio processing operations to optimize the sound quality. For example, mobile communication device 102 can perform echo cancellation to reduce feedback between sound produced by speaker 108 and sound detected by microphone 110. As another example, mobile communication device 102 may also perform noise reduction operations and/or automatic gain control operations on signals received via microphone 110. Those skilled in the art will recognize that a variety of audio processing techniques, including but not limited to techniques presently known in the art, can be used in connection with various embodiments of the present invention; accordingly a detailed description of such techniques has been omitted.

Other operations supported by mobile communication device 102 can include, e.g., storage and playback of media assets; access to the Internet, e.g., via wireless connections such as Wi-Fi (referring generally to any standard within the IEEE 802.11 family) and/or advanced wireless data networks using third-generation ("3G") technology; and execution of various application programs that can be installed on mobile communication device 102 by a user. Some of these application programs may call for mobile communication device 102 to provide audio output and/or accept audio input, as well as performing other operations, and in some embodiments, mobile communication device 102 can use built-in speakers 108 and/or microphone 110 whenever audio operations are needed by a particular application.

Mobile communication device 102 can also include a connector 112 that can receive one end connector 113 of cable 106. Connector 112 can include a number of pins assigned to carry various signals, including audio signals from mobile communication device 102 to accessory 104 (referred to herein as "line-out" or "audio-out" signals) and audio signals from accessory 104 to mobile communication device 102 (referred to herein as "line-in" or "audio-in" signals). Connector 112 can also include pins assigned to carry other signals, such as video signals and/or digital data (including, e.g., commands and other information as described below), as well as pins for providing electrical power and ground connections between mobile communication device 102 and accessory 104. In one embodiment, a certain pin (or pins) can be assigned to deliver power from mobile communication device 102 to accessory 104 while another pin (or pins) can be assigned to deliver power from accessory 104 to mobile communication device 102. Thus, either device in system 100 can provide power to the other.

Accessory 104 can receive other end connector 115 of cable 106 at an accessory connector 114. In some embodiments, accessory connector 114 can have a different form factor and/or number of contacts from mobile communication device connector 112. In other embodiments, the two connectors can be the same, and in still other embodiments, accessory connector 114 can be designed to mate directly with mobile communication device connector 112 so that cable 106 is not required. In further embodiments, some or all communication between mobile communication device 102 and accessory 104 may take place wirelessly, e.g., via Bluetooth or other short-range wireless protocols.

Accessory 104 can be a speaker dock or any other accessory that is capable of receiving audio signals from mobile communication device 102 and/or providing audio signals to mobile communication device 102 (e.g., via cable 106). In the embodiment shown, accessory 104 includes stereo speakers 122 that can produce sounds in response to audio signals received from mobile communication device 102 and a microphone 124 that can generate electrical signals in response to sounds. Accessory 104 can provide the electrical signals generated by microphone 124, with or without processing, to mobile communication device 102, e.g., via cable 106. In particular, accessory 104 may be capable of concurrently receiving audio signals from and supplying audio signals to mobile communication device 102; this mode of operation is referred to herein as "duplex" mode and is contrasted with "simplex" modes in which accessory 104 can be either receiving audio signals or supplying audio signals but not both concurrently.

When operating in duplex mode (or simplex mode), accessory 104 can be capable of performing various audio processing operations to optimize sound quality. For example, when operating in either simplex or duplex mode, accessory 104 can implement noise reduction and/or automatic gain control techniques to improve the quality of signals generated by microphone 124. When operating in duplex mode, accessory 104 can also implement echo cancellation techniques between the signals output to speakers 122 and signals received from microphone 124. As with audio processing by mobile communication device 102, a variety of audio processing techniques, including but not limited to techniques presently known in the art, can be used in connection with embodiments of the present invention; a detailed description of such techniques has been omitted.

Accessory 104 can also provide user interface components such as volume control 126 and display 128. In addition or instead, accessory 104 can be equipped with a remote control 130 that can communicate user input to accessory 104 via a wireless channel (e.g., using infrared or radio-frequency (RF) signaling). Remote control 130 can include various controls, e.g., buttons 132. In some embodiments, remote control 130 can include a display area 134 for providing visual information to the user. Thus, a user can operate accessory 104 by interacting directly with user interface components 126, 128 or by interacting with remote control 130.

In some embodiments, user interface components of accessory 104 (including components 126, 128 and/or remote control 130) can be operated to control various operations of mobile communication device 102. For example, accessory 104 can generate commands to mobile communication device 102 based on user input received via remote control 130; the commands can be communicated to mobile communication device 102 via cable 106. Mobile communication device 102 can invoke various of its functions in response to these commands. As one example, a user can operate remote control 130 (or interface components 126, 128) to place and/or receive phone calls on mobile communication device 102, as described below.

It will be appreciated that system 100 is illustrative and that variations and modifications are possible. A variety of mobile communication devices 102 and accessories 104 can be used. The degree to which mobile communication device 102 can be controlled via accessory 104 can be varied as desired.

Figure 2:
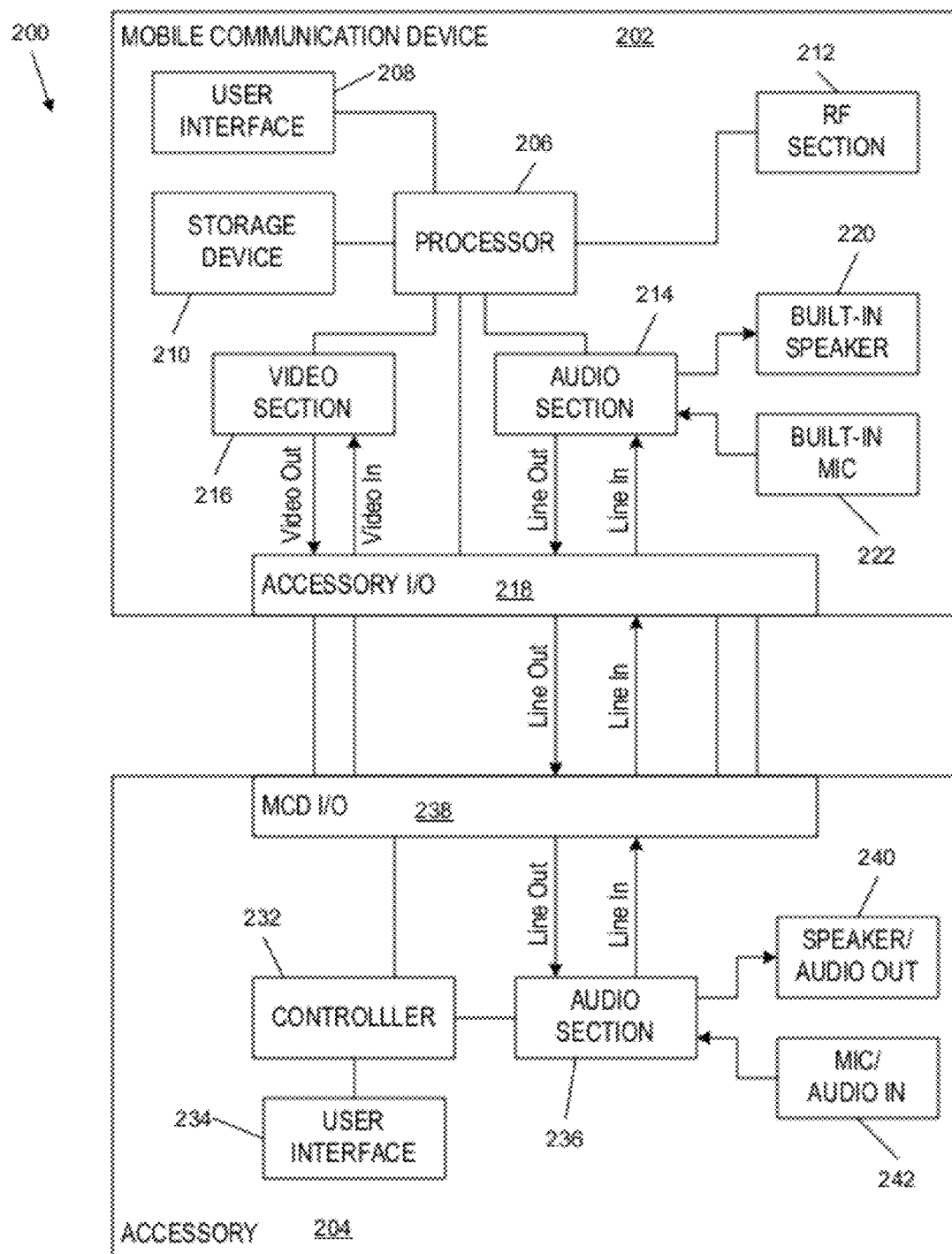
FIG. 2 is a simplified block diagram showing a system according to an embodiment of the present invention.

FIG. 2 is a simplified block diagram showing a system 200 according to an embodiment of the present invention. In some embodiments, system 200 can implement system 100 of FIG. 1. System 200 includes a mobile communication device ("MCD") 202 connected to an accessory 204.

MCD 202, which in some embodiments can implement mobile communication device 102 of FIG. 1, includes a processor 206, a user interface 208, a storage device 210, a radio-frequency ("RF") section 212, an audio section 214, a video section 216, an accessory I/O ("input/output") interface 218, a built-in speaker 220 and a built-in microphone ("mic") 222.

Processor 206, which can be implemented as one or more integrated circuits (including, e.g., a conventional microprocessor or microcontroller), can control the operation of PMD 202. For example, in response to user input signals provided by user interface 208, processor 206 can select and play media assets stored in storage device 210; operate RF section 212 to place and/or receive telephone calls; execute various application programs residing on storage device 210; and so on. Processor 206 can also manage communication with accessories via accessory I/O interface 218.

User interface 208 can include input controls such as a touch pad, touch screen, scroll wheel, click wheel, dial, button, keypad, or the like, as well as output devices such as a display screen, indicator lights, etc., together with supporting electronics (e.g., digital-to-analog or analog-to-digital converters, signal processors or the like). Although shown separately, built-in speaker 220 and/or built-in microphone 222 can operate as components of user interface 208 to provide sound output to a user and to receive sound input from a user, respectively. A user can operate the various input controls of user interface 208 to invoke the functionality of PMD 202 and can also view and/or hear output from PMD 202 via user interface 208.

Storage device 210 may be implemented, e.g., using disk, flash memory, or any other non-volatile storage medium. In some embodiments, storage device 208 can store media assets such as audio, video, still images, or the like, that can be played by mobile communication device 202. Storage device 210 can also store metadata describing the media assets (e.g., asset name, artist, title, genre, etc.), playlists (lists of assets that can be played sequentially or in random order), and the like. Storage device 210 can also store information other than media assets, such as information about a user's contacts (names, addresses, phone numbers, etc.); scheduled appointments and events; notes; and/or other personal information. In still other embodiments, storage device 210 can store one or more programs to be executed by processor 206, such as video game programs, personal information management programs, programs for playing media assets and/or navigating the media asset database, programs for controlling a telephone interface to place and/or receive calls, and so on.

RF section 212 provides an interface to a mobile communication network. In one embodiment, the mobile communication network can be a cellular telephone network or other network capable of carrying a telephone call between mobile communication device 102 and another telephone device (not shown). RF section 212 can include analog-to-digital and/or digital-to-analog circuitry, baseband processing components (e.g., codecs, channel estimators, and the like), modulators, demodulators, oscillators, amplifiers, transmitters, receivers, transceivers, internal and/or external antennas, and so on. As such, RF section 212 can include one or more integrated circuits as desired. In some embodiments, some operations associated with RF section 212 can be implemented entirely or in part as programs executed on processor 206 (e.g., encoding, decoding, and/or other processing in the digital domain), or a dedicated digital signal processor can be provided. In some embodiments, RF section 212 may also be operable to wirelessly access other communication networks such as the Internet, e.g., using 3G, WiFi, Bluetooth, and/or other RF communication technologies. Thus, for example, multiple transmitter, receiver, and/or transceiver chips may be present in RF section 212, and different chips may use a separate antenna or share an antenna; alternatively, a single chip can support multiple communication channels and/or networks using one or more antennas.

Audio section 214 can control the routing of analog and/or digital audio signals within mobile communication device 202 and can also implement audio processing operations such as noise reduction, echo cancellation, gain control, analog-to-digital and digital-to-analog conversion, and the like. (Although shown separately, some or all operations of audio section 214 can be implemented as software executed by processor 206.) In particular, audio section 214 can select a source to provide input audio signals. In one embodiment, audio section 214 can select between built-in microphone 222 and a "line-in" signal delivered from accessory I/O interface 218. In another embodiment, MCD 202 can have one or more additional sources of audio signals; for example, MCD 202 may have an external microphone jack, a Bluetooth receiver capable of receiving voice or other audio signals, or the like. Audio section 214 can select incoming audio from any available source, process the audio as desired (e.g., convert analog audio signals to digital, apply noise reduction and/or echo cancellation, etc.) and route it to another destination. For instance, during a phone call, audio section 214 might route incoming audio from built-in microphone 222 to RF section 212. (A direct connection between audio section 214 and RF section 212 is not shown in FIG. 2, but it is to be understood that such direct routing can be implemented if desired.)

Similarly, audio section 214 can select a destination to receive output audio signals. In one embodiment, audio section 214 can select between built-in speaker 220 and a "line-out" signal delivered to accessory I/O interface 218. In another embodiment, MCD 202 can have one or more additional destinations for output audio signals; for example, MCD 202 may have a jack for connecting external speakers or headphones, a Bluetooth transmitter capable of transmitting voice or other audio signals, or the like. Audio section 214 can route audio signals to any available destination. For instance, during a phone call, audio section 214 might route incoming audio signals extracted by RF section 212 to built-in speaker 220.

In some embodiments, the routing and processing decisions made by audio section 214 can be controlled by processor 206. For example, audio section 214 may have one or more control registers into which processor 206 can write control parameters indicating what audio section 214 should do. Examples of control parameters include: selection of audio source; selection of audio destination; selection of which (if any) signal processing operations to perform on a received audio signal before routing that signal to a destination; various settings to regulate aspects of audio signal processing operations; and so on. In some embodiments, program code executing on processor 206 can include instructions to update some or all of these control parameters, thereby altering the manner in which audio is processed and/or routed by audio section 214.

Video section 216 can control video delivery by MCD 202. For example, during playback of a video asset stored in storage device 210, video section 216 can route video signals to a built-in display (not explicitly shown but understood to be part of user interface 208) and/or to a "video out" line of accessory I/O interface 218. In embodiments where MCD 202 is capable of receiving video signals from an external source, video section 216 can select the external source (e.g., a "video in" line from accessory I/O interface 218) and direct the video signals to a destination, for instance, processor 206. Video section 216 in some embodiments can include video processing capability such as image scaling, format conversions, etc. As with audio section 214, operation of video section 216 can be controlled by processor 206, e.g., by writing control parameters to control registers of video section 216.

Accessory I/O interface 218 can include a number of signal paths configured to carry various signals between MCD 202 and accessory 204. In one embodiment, accessory I/O interface 218 includes a 30-pin connector corresponding to the connector used on iPod® and iPhone™ products manufactured and sold by Apple Inc. Alternatively or additionally, accessory I/O interface 218 can include a wireless interface (e.g., Bluetooth or the like).

In some embodiments, MCD 202 can also use accessory I/O interface 218 to communicate with a host computer (not explicitly shown) that executes a media asset management program (such as the iTunes® media asset management program distributed by Apple Inc.). In some embodiments, the media asset management program can allow a user to modify the database of media assets stored in storage device 210; to update personal data (e.g., calendar, contacts) stored in storage device 210; and/or to add, update, or remove application programs on storage device 210. In other embodiments, MCD 202 can include a wireless interface (not explicitly shown) that can provide communication with a host computer and/or a computer network.

Accessory 204, which in some embodiments can implement accessory 104 of FIG. 1, can include a controller 232, a user interface 234, an audio section 236, an MCD I/O interface 238, a speaker 240, and a microphone 242.

Controller 232 can include, e.g., a microprocessor or microcontroller executing program code to perform various functions such as digital audio decoding, analog or digital audio and/or video processing, processing of user input, and the like. Controller 232 can also manage communication with an MCD via MCD I/O interface 238.

User interface 234 can include input controls such as a touch pad, touch screen, scroll wheel, click wheel, dial, button, keypad, microphone, or the like, as well as output devices such as a display screen, indicator lights, etc., together with supporting electronics (e.g., digital-to-analog or analog-to-digital converters, signal processors or the like). In some embodiments, user interface 234 can also incorporate a receiver for signals from an associated remote control device (e.g., remote control 130 of FIG. 1). Although shown separately, speaker 240 and/or microphone 242 can operate as components of user interface 234 to provide sound output to a user and to receive sound input from a user, respectively. A user can operate the various input controls of user interface 234 to invoke the functionality of accessory 204 and can view and/or hear output from accessory 204 via user interface 234. In some embodiments, the user can also operate the various input controls of user interface 234 to invoke functionality of MCD 202 via accessory 204. For example, in response to user input, controller 232 may generate commands to be sent to MCD 202 via MCD I/O interface 238.

Audio section 236 can receive the "line-out" signal from MCD 202 via MCD I/O interface 238 and can route the signal appropriately. (Throughout this disclosure, the audio signals exchanged between an MCD and an accessory are referred to from the perspective of the MCD; thus, "line-out" or "audio-out" is to be understood as referring generally to an audio signal delivered from the MCD to the accessory, while "line-in" or "audio-in" refers generally to an audio signal delivered from the accessory to the MCD.) For instance, audio section 236 can route the line-out signal to speaker 240 or to an external speaker connection (not explicitly shown). Similarly, audio section 236 can select an audio signal to be delivered as the "line-in" signal to MCD 202 via MCD I/O interface 238. For instance, audio section 236 can select microphone 242 or an external microphone connection (not explicitly shown) as an audio source. In some embodiments, audio section 236 can also effectively cut off an audio signal; for instance, it can be configured to ignore any received line-out signal from MCD 202 and/or to provide no line-in signal to MCD 202.

In various embodiments, audio section 236 can route signals with or without further processing. For example, audio section 236 can be configured to perform noise reduction, echo cancellation, gain control, and/or other processing on audio signals received from microphone 242 before delivering them to the line-in signal path.

Configuration of audio section 236 can be controlled by controller 232, e.g., by writing control parameter values to control registers of audio section 236. For example, at a certain time, controller 232 can configure audio section 236 to operate in a duplex mode in which a line-out signal received from MCD 202 is routed to speaker 240 (or an external speaker connection) concurrently with delivering an audio signal received from microphone 242 (or an external microphone connection) as a line-in signal to MCD 202. At a different time, controller 232 can configure audio section 236 to operate in an output-only simplex mode in which line-out is routed to speaker 240 while line-in is not generated or in an input-only simplex mode in which line-in is generated from microphone 242 while line-out is not routed to any destination (i.e., it is ignored).

It will be appreciated that the system configurations and components described herein are illustrative and that variations and modifications are possible. The PMD and/or accessory may have other capabilities not specifically described herein.

Accessory I/O interface 218 of MCD 202 and MCD I/O interface 238 of accessory 204 allow MCD 202 to be connected to accessory 204 and subsequently disconnected from accessory 204. As used herein, MCD 202 and accessory 204 are "connected" whenever a communication channel between accessory I/O interface 218 and MCD I/O interface 238 is open and are "disconnected" whenever the communication channel is closed. Connection can be achieved by physical attachment (e.g., between respective mating connectors of MCD 202 and accessory 204), by an indirect connection such as a cable, or by establishing a wireless communication channel. Similarly, disconnection can be achieved by physical detachment, disconnecting a cable, powering down accessory 204 or MCD 202, or closing the wireless communication channel. Thus, a variety of communication channels may be used, including wired channels such as USB, FireWire, or universal asynchronous receiver/transmitter ("UART"), or wireless channels such as Bluetooth, WiFi, infrared or the like. In some embodiments, multiple communication channels between a media player and an acessory can be open concurrently, or a media player can be concurrently connected to multiple accessories, with each accessory using a different communication chnannel.

Regardless of the particular communication channel, as long as MCD 202 and accessory 204 are connected to each other, the devices can communicate by exchanging commands and data according to a protocol. The protocol defines a format for sending messages between MCD 202 and accessory 204. For instance, the protocol may specify that each message is sent in a packet with a header and an optional payload. The header can provide basic information such as a start indicator, length of the packet, and a command to be processed by the recipient, while the payload provides any data associated with the command; the amount of associated data can be different for different commands, and some commands may provide for variable-length payloads. The packet can also include error-detection or error-correction codes, e.g., as known in the art. In various embodiments, the protocol can define specific commands to indicate an action to be taken by the recipient; to signal completion of a task, change of state, or occurrence of an error; and/or to identify the nature of the associated data. In some embodiments, the commands may be defined such that any particular command is valid in only one direction.

The protocol can define a number of "lingoes," where a "lingo" refers generally to a group of related commands that can be supported (or unsupported) by various classes of accessories. In one embodiment, a command can be uniquely identified by a first byte identifying the lingo to which the command belongs and a second byte identifying the particular command within the lingo. Other command structures may also be used. It is not required that all accessories, or all MCDs to which an accessory can be connected, support every lingo defined within the protocol or every command of a particular lingo (for instance, different devices might use different versions of a given lingo).

In some embodiments, every accessory 204 and every MCD 202 that are designed to be interoperable with each other support at least a "general" lingo that includes commands common to all such devices. The general lingo can include commands enabling the MCD and the accessory to identify themselves to each other and to provide at least some information about their respective capabilities, including which (if any) other lingoes each supports and which capabilities of the other device each intends to use while connected. For example, the accessory may use one or more identification commands to indicate whether it has a microphone or other source of line-in, whether it can receive line-out from MCD 202, whether it supports duplex mode (using both line-in and line-out capabilities of MCD 202 simultaneously), and/or whether it intends to send commands for remotely controlling operations of MCD 202.

The general lingo can also include authentication commands that the MCD can use to verify the purported identity and capabilities of the accessory (or vice versa), and the accessory (or MCD) may be blocked from invoking certain commands or lingoes if the authentication is unsuccessful.

The protocol can also include various Notify commands that can be sent by MCD 202 to accessory 204 upon the occurrence of certain events. Each event may have a different associated Notify command, or fewer Notify commands can be used, with each instance of a Notify command carrying associated data indicative of the particular event. In some embodiments, the protocol can also include one or more Register commands that accessory 204 can use to subscribe to or unsubscribe from receiving particular Notify commands or notifications of particular events. In other embodiments, MCD 202 can determine which notifications accessory 204 should receive based on the identification information provided by accessory 204. For instance, if accessory 204 indicates that it can operate in a duplex mode, MCD 202 may determine that accessory 204 should receive notifications as to when duplex mode should be entered or exited. In still other embodiments, a combination of accessory-driven subscription and determinations by the MCD can be used to control which notifications are sent to a particular accessory.

The protocol can also include commands or groups of commands that support remote control of various operations of MCD 202 by accessory 204 For example, one remote control command can be a ButtonStatus command sendable by accessory 204 to MCD 202. This command can be sent with associated data in the form of a bitmask indicating the current state of various user-operable controls of accessory 204. Based on the bitmask, MCD 202 can take various actions. For example, certain bits of the bitmask can be associated with accepting an incoming call ("Answer"), diverting an incoming call to voice mail ("Divert"), or ending a current call ("Hang Up"); thus, accessory 204 can instruct MCD 202 to take any of these actions.

Another remote control command can be a DialNumber command sendable by accessory 204 to MCD 202. The associated data for this command can be, for example, a telephone number. Upon receiving this command, MCD 202 can initiate a telephone call to the specified number. Still other commands can be provided. For example, a VoiceDial command sendable by accessory 204 might be provided. Upon receiving the VoiceDial command, MCD 202 can enable line-in and receive audio from accessory 204. The user can then speak a name, telephone number, or other words that map to a particular telephone number into microphone 242; audio section 236 routes the corresponding audio signal as line-in to MCD 202. Processor 206 (or another component) of MCD 202 can analyze the sound and determine a number to call.

Other remote-control commands can be provided to allow a user of accessory 204 to navigate contacts stored in storage device 210 of MCD 202 by interacting with user interface 234 of accessory 204. For example, in one embodiment, the user can search for a contact by name or number, or the user can browse a listing of contacts that can be filtered or grouped by name, company name, user-assigned category, or the like. Such navigation commands can include a selection command sendable by accessory 204 to inform MCD 202 of the user's desired action and a responsive command sendable by MCD 202 to provide information resulting from the action (e.g., a list of contacts or information about the list, such as the number of contacts found) to accessory 204. In some embodiments, depending on the amount of information sendable by MCD 202, a user can view the contact information on a display device of accessory 204 and/or on a display device of MCD 202. The navigational commands can include a DialContact command sendable by accessory 204 to instruct MCD 202 to call a contact selected by the user.

It will be appreciated that the protocol described herein is illustrative and that variations and modifications are possible. Specific commands described herein can be replaced with other commands or combination of commands or other types of messages and formats. In addition, it is not required that all of the commands and operations described herein be supported by any particular mobile communication device or accessory.

Certain embodiments relate to the use of accessory 204 in conjunction with MCD 202 to provide a speaker phone, allowing a user to place and/or receive calls via MCD 202 by operating accessory 204. Referring again to FIG. 2, during a phone call, the user's voice can be detected by microphone 242 of accessory 204 and delivered as line-in to MCD 202. Within MCD 202, audio section 214 can route the line-in signal (with or without further processing) to RF section 212 to be transmitted across the telephone network, thus allowing the user to speak to the other party (or parties) to the call. Similarly, RF section 212 can receive signals corresponding to the other party's voice. These signals can be decoded (e.g., in RF section 212 and/or processor 206) and delivered as an audio signal to audio section 214. Audio section 214 can route this signal (with or without further processing) on the line-out path to accessory 204. Within accessory 204, audio section 236 can route the line-out signal to speaker 240, thus allowing the user to hear the other party. During such operations, built-in speaker 220 and built-in microphone 222 of MCD 202 can be disabled.

During such a phone call, echo cancellation between speaker 240 and microphone 242 may be desirable to the extent that microphone 242 can pick up sounds from speaker 240. As described above, both MCD 202 and accessory 204 can have echo cancellation capability; however, it would not be desirable for both to perform echo cancellation on the same signal. Accordingly, some embodiments provide coordinated control of echo cancellation so that echo cancellation is performed by only one device. In embodiments described below, accessory 204 performs the echo cancellation during a phone call; echo cancellation built into accessory 204 can be more readily optimized for the particular characteristics of speaker 240 and microphone 242. However, other embodiments may provide that MCD 202 performs echo cancellation.

Figure 3:
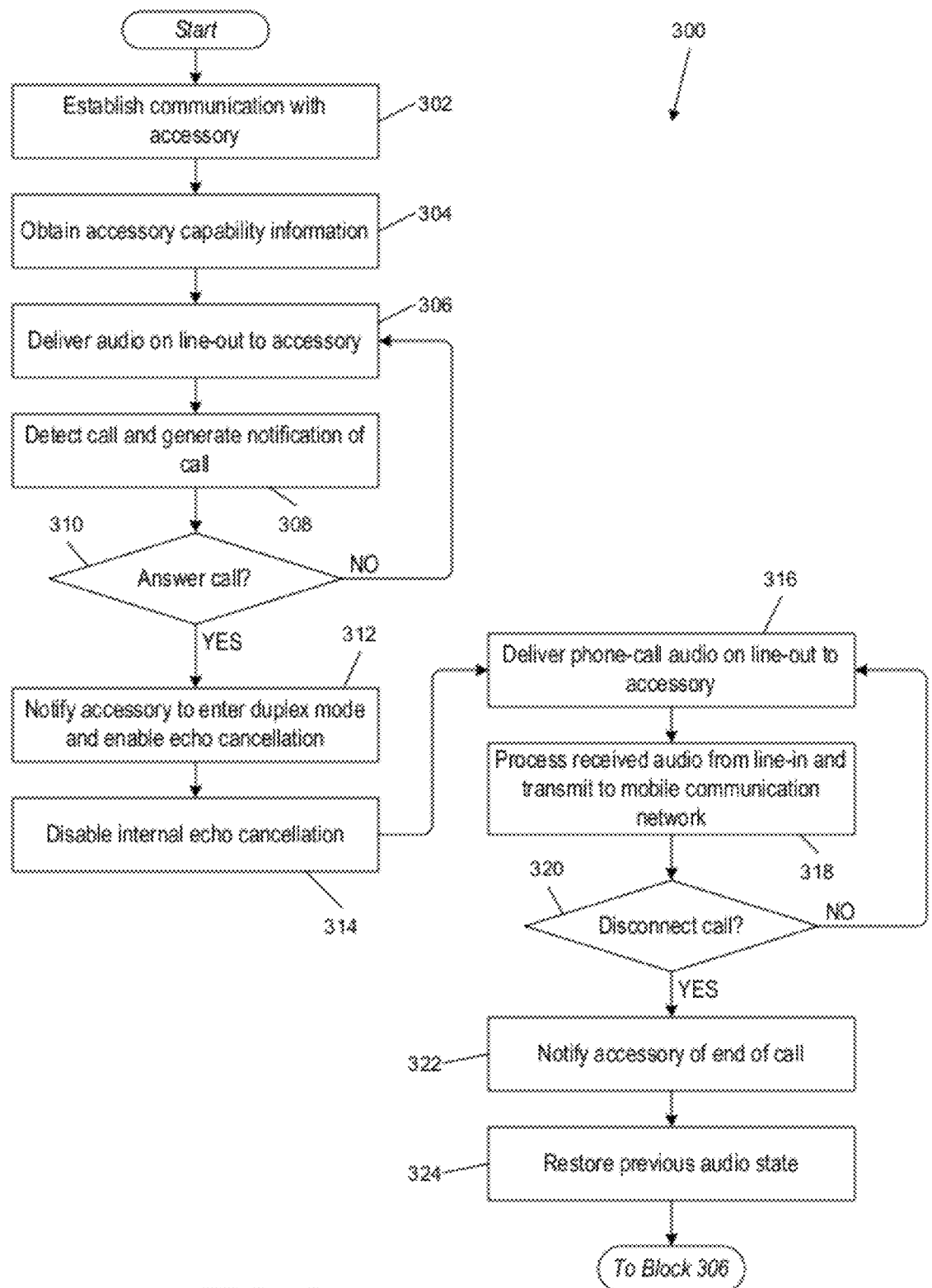
FIG. 3 is a flow diagram of a process for handling an incoming telephone call by a mobile communication device according to one embodiment of the present invention.

FIG. 3 is a flow diagram of a process 300 for handling an incoming telephone call by a mobile communication device according to one embodiment of the present invention. In this embodiment, before the call is received, a mobile communication device (e.g., MCD 202 of FIG. 2) is connected to an accessory (e.g., accessory 204) that is operable in a duplex mode but not currently operating in duplex mode. For example, the accessory might be operating as a speaker dock, playing audio content stored on MCD 202.

Process 300 can start when accessory 204 becomes connected to MCD 202. At block 302, MCD 202 establishes communication with accessory 204. In some embodiments, establishing communication can include identification and authentication in accordance with the communication protocol. At block 304, MCD 202 can obtain capability information from accessory 204. For example, accessory 204 can indicate whether it provides a microphone, whether it is capable of operating in a duplex mode, and whether it provides echo cancellation; accessory 204 can also provide any other applicable information about its capabilities, including other audio processing capabilities such as noise reduction. In some embodiments, accessory 204 can provide any or all of its capability information as part of establishing communication at block 302. In some embodiments, process 300 continues only if accessory 204 supports at least duplex mode and echo cancellation.

At block 306, MCD 202 can begin delivering audio signals (line-out) to accessory 204. For example, a user might operate MCD 202, either directly or using a remote control feature supported by accessory 204, to select one or more audio or video tracks for playback. MCD 202 can route the audio portion of the track to accessory 204. Delivery of audio signals to accessory 204 can continue indefinitely.

At block 308, MCD 202 detects a phone call (in this example, an incoming call) and can generate an alert for the user. For example, MCD 202 can pause the playback of any currently playing track and play a ringtone, display a message, vibrate, and/or take other action to alert a user to an incoming phone call. At block 310, MCD 202 determines whether the user desires to answer the call. For example, the user can press an "answer" button on MCD 202. Or in some embodiments, the user can communicate a desire to answer by operating accessory 204, which can send a remote-control command such as the ButtonStatus command described above to report the user's desire to MCD 202. The user can also choose not to answer, e.g., by operating a "divert" control to divert the call to voice mail or by taking no action at all within an allotted period. If the user does not answer the call, MCD 202 can resume playback of the currently playing track, and process 300 can return to step 306 until another incoming call is detected.

If, at block 310, the user chooses to answer the call, then at block 312, MCD 202 notifies accessory 204 to enter duplex mode and to enable its echo cancellation features. In one embodiment MCD 202 can send a "begin call" notification message to indicate that a phone call is now in progress, and accessory 204 can interpret this message as a signal to enter duplex mode and enable echo cancellation. In another embodiment, MCD 202 can send one or more specific commands to instruct accessory 204 to enter duplex mode and enable echo cancellation. At block 314, MCD 202 can disable its own internal echo cancellation. In some embodiments, if MCD 202 has not already enabled line-in from accessory 204, it can do so at block 314.

At block 316, MCD 202 can deliver received audio content for the phone call to accessory 204 as the line-out signal. As described above, this content may be received via RF section 212 and processed (or not) by audio section 214 prior to delivery as line-out. At block 318, MCD 202 can process audio content received from accessory 204 via line-in and transmit it to the mobile communication network, e.g., via RF section 212. Such processing can include conversion to a digital format, modulation, etc., but in this embodiment does not include echo cancellation by MCD 202 (which was disabled at block 314). It is to be understood that acts associated with blocks 316 and 318 may be performed simultaneously or concurrently; thus, the user can speak to the caller while hearing anything the caller might say.

At block 320, it is determined whether the call should be disconnected. For example, MCD 202 may detect that the call has been terminated by the mobile communication network (e.g., if the other party hangs up or the connection is lost). MCD 202 may also detect that its user has indicated that the call should end. For instance, in some embodiments, the user can press a "hang up" button on MCD 202; in other embodiments, the user can communicate a desire to end the call by operating accessory 204, which can send a remote-control command such as the ButtonStatus command described above to report the user's desire to MCD 202. Until such time as MCD 202 determines that the call should be disconnected, blocks 316 and 318 can continue to be executed. Once MCD 202 determines that the call should be ended, at block 322, MCD 202 can notify accessory 204 of the end of the call. In one embodiment, MCD 202 can send an "end call" notification message to indicate that the phone call is no longer in progress. Accessory 204 can interpret this notification as a signal to exit duplex mode (e.g., returning to the line-out-only mode) and to disable its echo cancellation.

At block 324, MCD 202 can reset its internal state to the state preceding the phone call, e.g., line-out enabled, line-in disabled. Process 300 can return to block 306; for example, MCD 202 can resume playing the track that was paused when the phone call was detected at block 308. Process 300 can continue indefinitely, e.g., until accessory 204 and MCD 202 become disconnected.

Figure 4:
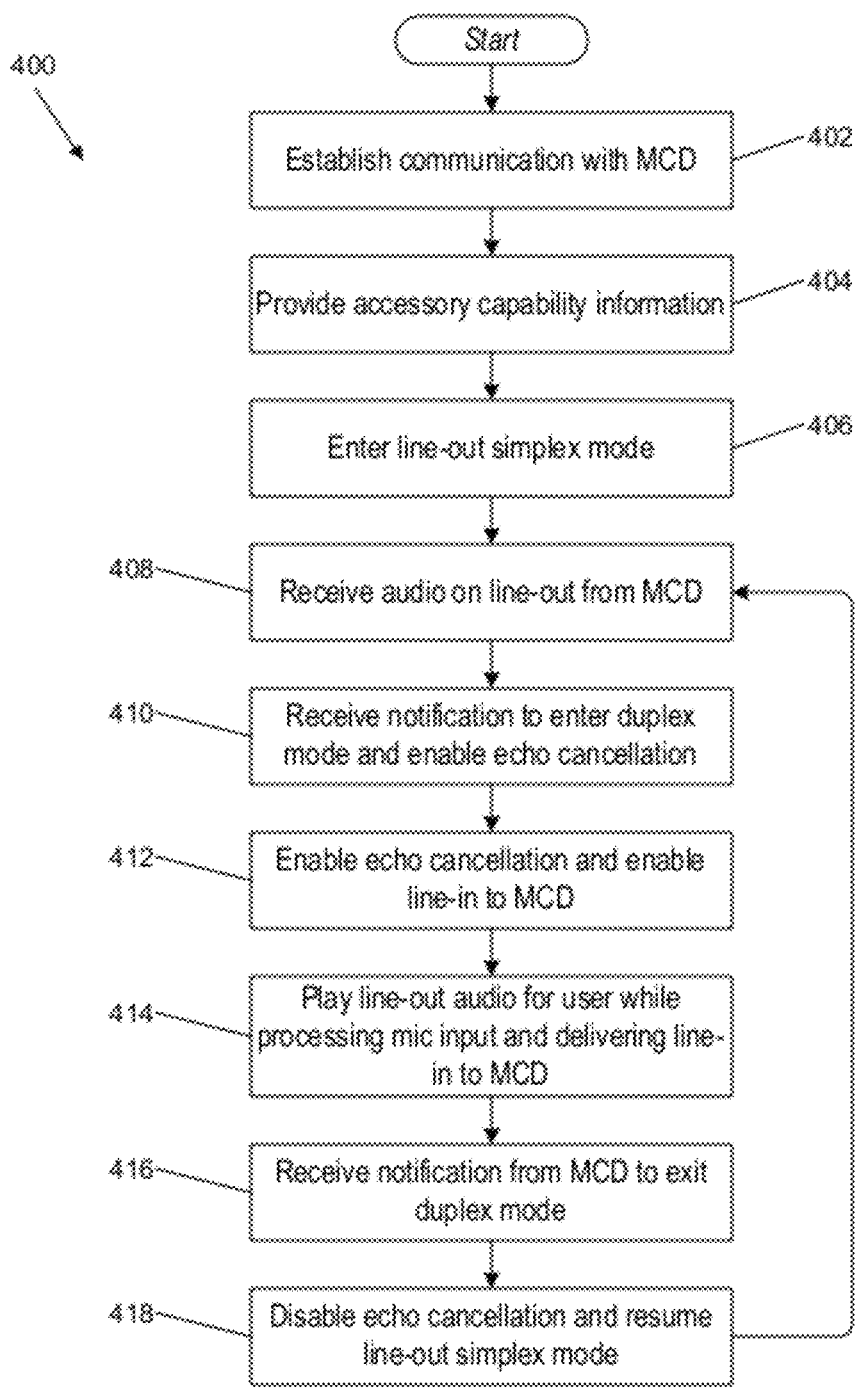
FIG. 4 is a flow diagram of a process for handling an incoming telephone call by an accessory device according to an embodiment of the present invention.

FIG. 4 is a flow diagram of a process 400 for handling an incoming telephone call by an accessory device according to an embodiment of the present invention. Process 400 can be executed by accessory 204 while MCD 202 executes process 300.

Process 400 can start when accessory 204 becomes connected to MCD 202. At block 402, accessory 204 establishes communication with MCD 202. Like block 302 of process 300, block 402 can include identification and authentication in accordance with the communication protocol. At block 404, accessory 204 can provide capability information to MCD 202. For example, accessory 204 can indicate whether it provides a microphone, whether it is capable of operating in a duplex mode, and whether it provides echo cancellation; accessory 204 can also provide any other applicable information about its capabilities, including other audio processing capabilities such as noise reduction. In some embodiments, accessory 204 can provide any or all of its capability information as part of establishing communication at block 402. In some embodiments, process 400 continues only if accessory 204 supports at least duplex mode and echo cancellation.

At block 406, accessory 204 can initialize its audio state, e.g., in line-out simplex mode. In this mode, accessory 204 can receive line-out from MCD 202 (block 408) but does not provide line-in to MCD 202; in some embodiments, audio section 236 of accessory 204 disables sending of signals onto the line-in path while in line-out simplex mode. Line-out simplex mode supports various operations not requiring two-way audio. For example, as noted above, a user can operate MCD 202 (either directly or using remote-control features supported by accessory 204) to play back various media tracks; the audio portion of the playback can be received as line-out by accessory 204. Process 400 can remain at block 408 indefinitely.

At block 410, accessory 204 receives a notification from MCD 202 that it should enter duplex mode and enable its echo cancellation features. For example, as described above, the notification can be a "begin call" notification message or one or more specific commands directing the accessory to take these actions. At block 412, accessory 204 responds to the notification by enabling its internal echo cancellation and enabling line-in to MCD 204, thus entering duplex mode.

At block 414, accessory 204 can play the line-out signal for the user (e.g., on speaker 240) while concurrently processing audio input (e.g., from microphone 242) and delivering the processed audio input as line-in to MCD 202. In this embodiment, processing of audio input by accessory 204 includes the echo cancellation that was enabled at block 412. Process 400 can continue at block 414 for as long as the phone call continues.

At block 416, accessory 204 can receive a notification from MCD 202 that duplex mode should be exited. For example, as described above, the notification can be an "end call" notification message or one or more commands instructing the accessory to take specific actions such as exiting duplex mode. At block 418, accessory 204 can respond to the notification by disabling its internal echo cancellation and disabling line-in to MCD 204, thus resuming the line-out simplex mode. Process 400 can then return to block 406. Thus, like process 300, process 400 can continue e.g., until accessory 204 and MCD 202 become disconnected.

It will be appreciated that processes 300 and 400 are illustrative and that variations and modifications are possible. Steps described as sequential may be executed in parallel, order of steps may be varied, and steps may be modified, combined, added or omitted. For instance, while the embodiment above describes the accessory as operating in a line-in simplex mode when a call is not in progress, other modes can also be used. For example, the accessory can operate in a line-out simplex mode when a call is not in progress, as might be the case if the user is operating the accessory and mobile communication device to record voice or other audio input via a microphone. (In such a case, the accessory's echo cancellation might not be active prior to the phone call since no signal is being delivered to the accessory's speaker.) Such recording can be paused when a call is received. In some instances, the accessory might have both line-in and line-out disabled at a time when a call is not in progress, e.g., if the user is simply using the accessory to charge the mobile communication device and is neither listening to nor recording audio. Where this is the case, the accessory can respond to a begin-call notification by enabling both line-in and line-out.

Further, the processes described above can be used to manage other types of audio processing in addition to or instead of echo cancellation. In some embodiments, for example, both the accessory and the mobile communication device can be capable of applying noise reduction techniques to an audio signal. Often, applying noise reduction at two stages can actually degrade the signal; thus, it may be desired to coordinate which device performs noise reduction. In one embodiment, the begin-call notification can signal the accessory to enable noise reduction and/or other audio processing in addition to or instead of echo cancellation, and the mobile communication device can disable its internal noise reduction, echo cancellation, or any other audio processing task that is designated to be handled by the accessory during the call. In some embodiments, the capability information exchanged between the mobile communication device and the accessory can include information indicating which audio processing capabilities the accessory does or does not use when in duplex mode. When a call is in progress, the accessory can enable the specified capabilities; when no call is in progress, these capabilities can be enabled or disabled depending on how the accessory is being used at any given time.

In addition, the embodiments described above refer to situations in which a phone call is received by MCD 202. In other embodiments, an accessory and a mobile communication device can interoperate to allow a user to place a call. For example, in process 300, detecting a call at step 308 can also include detecting that the user is placing a call. In some embodiments, a user can place a call by interacting directly with the user interface of the mobile communication device even while the accessory is connected and can then use the accessory to provide audio input and output for the call as described above.

Figure 5:
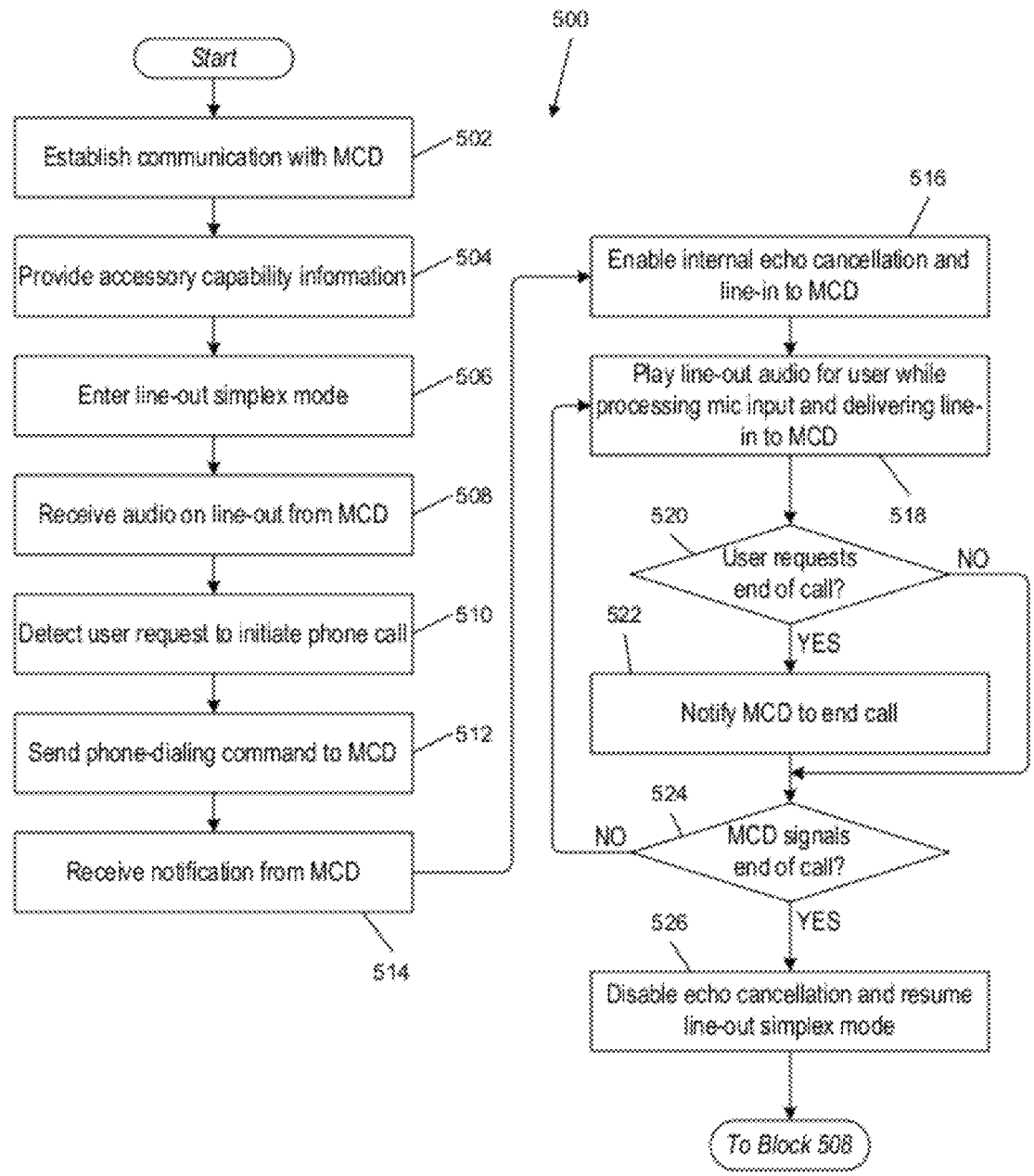
FIG. 5 is a flow diagram of a process for placing a call according to an embodiment of the present invention.

In other embodiments, a user can place a call by interacting with an accessory rather than directly with a mobile communication device. FIG. 5 is a flow diagram of a process 500 for placing a call according to an embodiment of the present invention. Process 500 can be executed by an accessory (e.g., accessory 204 of FIG. 2) that is connected to a mobile communication device (e.g., MCD 202 of FIG. 2).

Process 500 can start when accessory 204 becomes connected to MCD 202. At block 502, accessory 204 establishes communication with MCD 202. As with process 400 described above, block 502 can include identification and authentication in accordance with the communication protocol. At block 504, accessory 204 can provide capability information to MCD 202. In particular, accessory 204 can indicate whether it provides a microphone, whether it is capable of operating in a duplex mode, whether it provides echo cancellation, and whether it intends to use remote control commands to control the MCD; accessory 204 can also provide any other applicable information about its capabilities, including other audio processing capabilities such as noise reduction. In some embodiments, accessory 204 can provide any or all of its capability information as part of establishing communication at block 502. In some embodiments, process 500 continues only if accessory 204 supports duplex mode and echo cancellation and also uses remote control commands.

At block 506, accessory 204 initializes its audio mode, e.g., to line-out simplex mode.

In this mode, accessory 204 can receive a line-out signal from MCD 202 (block 508) but does not provide a line-in signal to MCD 202. For example, as noted above, a user can operate MCD 202 (either directly or using remote-control features supported by accessory 204) to play back various media tracks; the audio portion can be received on the line-out path by accessory 204. Process 500 can remain at block 508 indefinitely. (As noted above, other embodiments may use other audio modes such as line-in simplex or audio-off mode.)

At block 510, accessory 204 detects user input requesting initiation of a phone call. For example, accessory 204 may provide user input controls that allow a user to dial a number, and accessory 204 can detect that the user has entered a number to dial. In other examples, accessory 204 may provide voice dialing, and the user can operate a control to indicate the desire to speak a phone number or name to be called.

At block 512, accessory 204 can send an appropriate phone-dialing command to MCD 202. For example, as noted above, the communication protocol can include a DialNumber command, allowing accessory 204 to provide MCD 202 with a number to be dialed. In the case of voice dialing, accessory 204 can enable line-in to MCD 202, disable line-out from MCD 204 and send a VoiceDial command to MCD 202; in response to the VoiceDial command, MCD 202 can sample the signal received via line-in to detect and recognize the user's spoken instruction and thereby determine a number to dial.

At block 514, accessory 204 can receive a message from MCD 202 indicating whether the call was successfully connected. In one embodiment, this can include the same begin-call notification as used in processes 300 and 400 described above, and the notification can be sent approximately when MCD 202 begins to place the call. At block 516, accessory 204 can respond to the begin-call notification by enabling echo cancellation and entering duplex mode (e.g., enabling line-in to MCD 202). At block 518, accessory 204 can play line-out signals received from MCD 202 for the user while processing microphone input and delivering the processed input via line-in to MCD 202; this can be similar to block 414 of process 400 described above.

In some embodiments, the accessory can enter duplex audio mode while MCD 202 is attempting to place the call. Thus, to the extent that MCD 202 generates audio signals reflecting the progress of placing a call (e.g., sounds indicating the number being dialed or transmitted to the network, a ringback tone while waiting for a called party to answer, etc.), those sounds can be delivered via line-out to accessory 204, allowing the user to monitor progress of making the call just as if the call had been placed by interacting directly with MCD 202.

Audio processing at block 518 can continue while at block 520 accessory 204 can continually monitor or periodically check to determine if the user has requested that the call should end. For example, the user may operate a "hang up" control on accessory 204. If the user requests that the call should end, at block 522, accessory 204 can notify MCD 202 to end the call, e.g., by sending a ButtonStatus command as described above with the bit corresponding to "Hang Up" set or by sending a specific EndCall command or the like. At block 524, accessory 204 can check for an end-call notification from MCD 202. MCD 202 may send the end-call notification, e.g., in response to the end-call instruction from accessory 204 at block 522 or in response to termination of the call by the mobile communication network (e.g., if the other party hangs up or the connection is lost). If no end-call notification is received at block 524, process 500 can return to block 518 to continue duplex-mode audio for the call.

Once the end-call notification is received at block 524, accessory 204 can disable its internal echo cancellation and resume the line-in simplex mode (or other audio mode that was enabled prior to placing the call) at block 526; process 500 can return to block 508 to resume playback of audio or other operation that may have been in progress when the call was placed.

Figure 6:
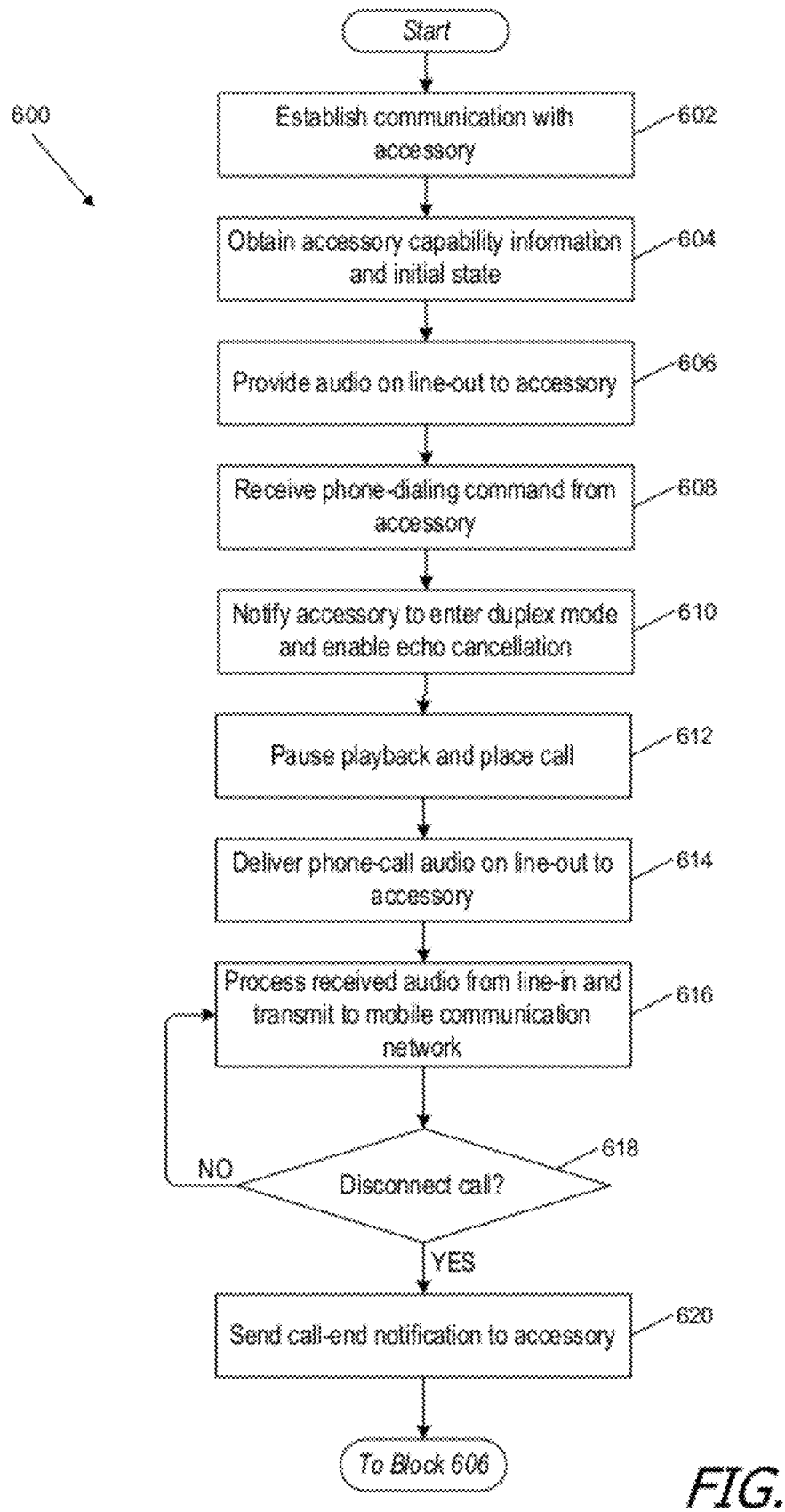
FIG. 6 is a flow diagram of a process for handling a telephone call placed using an accessory device according to an embodiment of the present invention.

FIG. 6 is a flow diagram of a process 600 for handling a telephone call placed using an accessory device according to an embodiment of the present invention. Process 600 can be executed by MCD 202 while accessory 204 executes process 500.

Process 600 can start when MCD 202 becomes connected to accessory 204. At block 602, MCD 202 establishes communication with accessory 204. As with other processes described above, block 602 can include identification and authentication in accordance with the communication protocol. At block 604, MCD 202 can obtain capability and initial state information from accessory 204. In particular, accessory 204 can indicate whether it provides a microphone, whether it is capable of operating in a duplex mode, whether it provides echo cancellation, and whether it intends to use remote control commands to control the MCD; accessory 204 can also provide any other applicable information about its capabilities, including other audio processing capabilities such as noise reduction. Accessory 204 can also provide initial-state information, e.g., whether it will begin operations in line-out simplex mode or some other mode. In some embodiments, accessory 204 can provide any or all of its capability and initial state information as part of establishing communication at block 602. In some embodiments, process 600 continues only if accessory 204 supports duplex mode and echo cancellation and also uses remote control commands.

At block 606, MCD 202 can begin delivering audio signals via the line-out path to accessory 204. For example, a user might operate MCD 202, either directly or using a remote control feature supported by accessory 204, to select one or more audio or video tracks for playback. MCD 202 can route the audio portion of the track to accessory 204. Delivery of audio signals to accessory 204 can continue indefinitely. Delivering line-out to accessory 204 at block 606 is appropriate if accessory 204 initially operates in line-out simplex mode or another mode in which it can receive line-out; in other embodiments, accessory 204 can initialize to a different audio mode, and MCD 202 may signal accessory 204 to enter line-out simplex mode before delivering audio at step 606. Alternatively, block 606 can involve other audio operations (e.g., recording from accessory 204) or simply waiting with both line-in and line-out disabled.

At block 608, MCD 202 can receive a phone-dialing command from accessory 204. In various embodiments, any of the commands described above or other commands can be received. At block 610, MCD 202 can send a begin-call notification to accessory 204; for instance, any of the notifications described above as signaling that accessory 204 should enter duplex mode can be used. At block 612, MCD 202 can place the call, and in some embodiments, playback of other audio on line-out to accessory 204 can be paused while the call is placed. MCD 202 can place a call in various ways. For instance, MCD 202 can "dial" a number by transmitting it onto the mobile communication network in the form of a request for a connection to the specified number. MCD 202 can then wait for a telephone connection to be established on the network. In the meantime, at block 614, MCD 202 can begin directing call-related audio to the line-out path so that it is delivered to the accessory. Thus, for example, MCD 202 can generate audio signals corresponding to "touch-tone" sounds indicating the number being transmitted onto the network and can generate signals corresponding to a ringback tone while waiting for the called party to answer. Such signals can be delivered via line-out to the accessory, allowing the user to hear the progress of the call being placed. Once the call connects, audio signals received via the mobile communication network can be processed and delivered via the line-out path to accessory 204; such processing can be similar to block 316 of process 300 (FIG. 3) described above.

Once the call connects, MCD 202 can begin processing received audio signals on line-in and transmitting the processed signals to the mobile communication network (block 616). Such processing can be similar to block 318 of process 300 described above. It is to be understood that acts associated with blocks 614 and 616 can be performed simultaneously or concurrently, thereby supporting duplex audio. Further, in this embodiment MCD 202 need not perform echo cancellation or any other audio processing that would conflict with processing by accessory 204.

At block 618, MCD 202 can determine whether the call should be disconnected. In one embodiment, the call can become disconnected without ever being truly connected (e.g., if the network or the called party fails to respond during placing the call at block 612 and the call does not divert to a voice mail or other automated answering system). In other embodiments, MCD 202 can receive a command from accessory 204 indicating that the call should be ended, e.g., as described above. In still other embodiments, MCD 202 can detect that the call has been terminated by the mobile communication network. As long as the call continues, MCD 202 can continue to execute blocks 614 and 616, allowing the user to speak and listen via accessory 204.

Once MCD 202 determines that the call should end, MCD 202 can send an end-call notification to accessory 204 at block 620; any of the notifications described above as signaling that accessory 204 should exit duplex mode can be used. Thereafter, the accessory can revert to line-out simplex mode (or other audio mode it may have been using prior to the call), and process 600 can return to block 606 to provide further audio to accessory 204. For example, MCD 202 can resume playback of a track that was paused when the call was initiated.

It will be appreciated that processes 500 and 600 are illustrative and that variations and modifications are possible. Steps described as sequential may be executed in parallel, order of steps may be varied, and steps may be modified, combined, added or omitted. For instance, as noted above, the accessory can operate in a mode other than line-out simplex mode when a call is not in progress; at the end of a call, the accessory can revert to the mode it was operating in prior to the call. Also as noted above, the techniques described herein can be used to regulate various aspects of audio processing behavior in addition to or instead of echo cancellation so that the accessory and the mobile communication device are in coordination as to what processing is to be done by which device.

Other techniques can also be used to place a call. For instance, if accessory 204 and MCD 202 support remote browsing of contacts stored on MCD 202 via the user interface of accessory 204, a user can operate accessory 204 to select a contact to be called; accessory 204 can send a command to MCD 202 identifying the contact to be called; and MCD 202 can access a database of contact information (e.g., in storage device 210) to place the call. In another embodiment, accessory 204 can maintain its own database of contacts, and the user may select a contact to call from that database.

Further, techniques similar to those described above can be used to coordinate audio processing between a mobile communication device and an accessory in contexts other than making and/or receiving phone calls. For example, referring again to FIG. 2, in another embodiment, accessory 204 and MCD 202 can interoperate to provide a karaoke machine. In one implementation, MCD 202 can play a song while a user sings into microphone 242 of accessory 204 (or an external microphone connected to accessory 204). The signal from microphone 242 can be delivered via line-in to MCD 202, which can mix the line-in signal with the audio signal of the song (e.g., in audio section 214 or processor 206) and route the mixed signal to line-out for delivery to speakers 240 of accessory 204. In some embodiments, MCD 202 can also display song lyrics and/or provide timing prompts to the user (e.g., changing color of the displayed lyrics as the words are to be sung). Similarly, MCD 202 can interoperate with accessory 204 as a mixing board, with accessory 204 providing, via the line-in path, a signal (e.g., corresponding to a voice, instrument, or any other audio source) that is to be mixed with an audio signal generated by MCD 202 and delivered back to accessory 204 as a line-out signal.

More generally, in a number of different situations, an accessory device can operate in duplex mode and the line-in signal to a mobile communication device can be looped back onto the line-out path by the mobile communication device, either alone or in combination with another signal. In such situations, embodiments of the present invention can allow the mobile communication device and accessory to coordinate audio processing for optimum sound.

Figure 7:
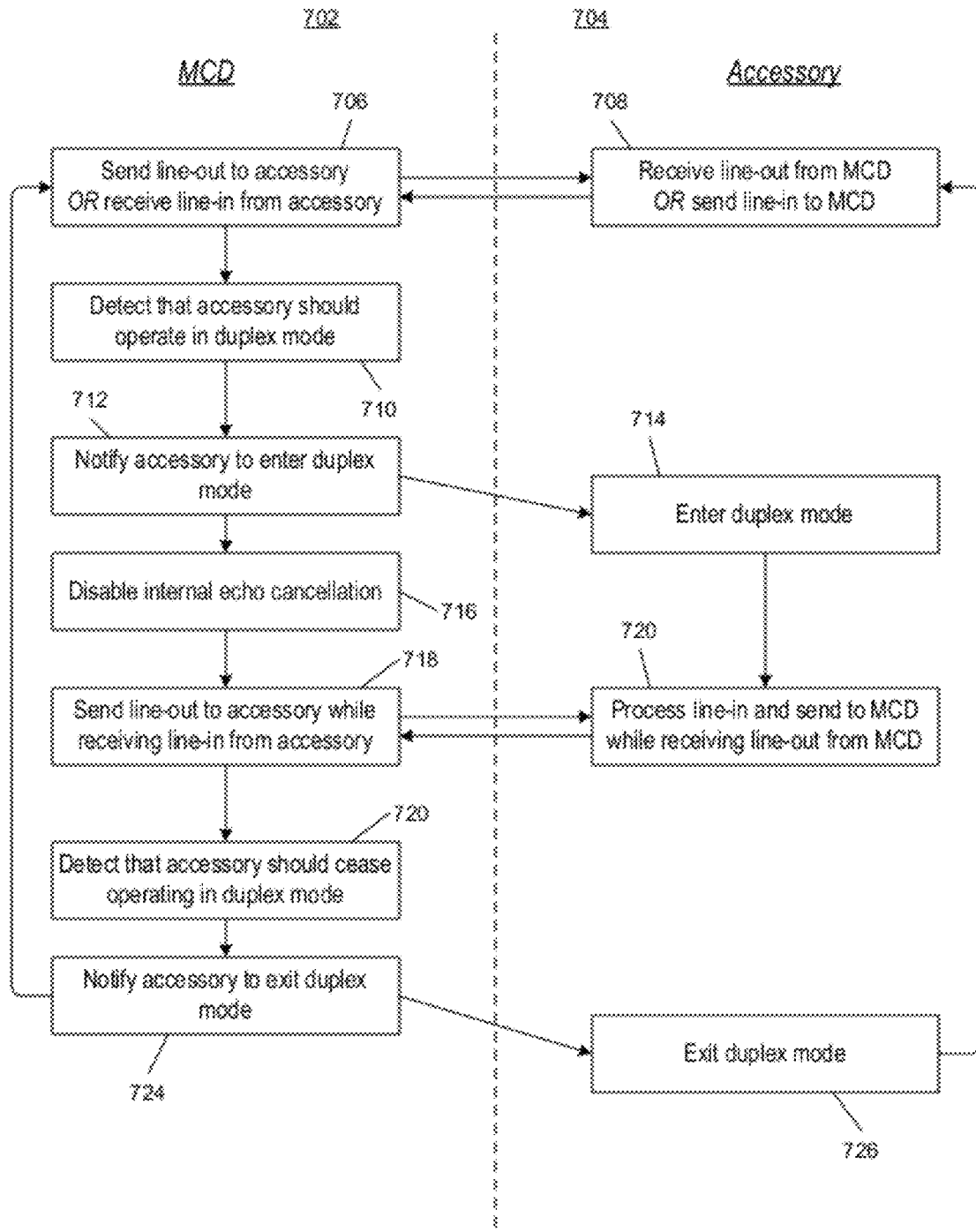
FIG. 7 is a message passing diagram illustrating coordination of audio processing between a mobile communication device and an accessory according to an embodiment of the present invention.

FIG. 7 is a message passing diagram illustrating coordination of audio processing between a mobile communication device and an accessory according to an embodiment of the present invention. Left-hand column 702 represents actions taken by a mobile communication device such as MCD 202 of FIG. 2; right-hand column 704 represents actions taken by an accessory device such as accessory 204 of FIG. 2. The MCD and the accessory can connect and exchange capability information as described above (not explicitly shown in FIG. 7) to establish an initial operating condition. In some embodiments, the initial operating condition can be a line-out simplex mode in which the MCD sends line-out to the accessory (block 706) and the accessory receives the line-out (block 708) or a line-in simplex mode in which the accessory sends line-in to the MCD (block 708) and the MCD receives the line-in (block 706).

At some point (block 710), the MCD can detect that the accessory should switch to duplex mode. For example, as described above, a phone call may be placed or received, or the user may launch a karaoke application, mixing-board application or other application in which the accessory should operate in duplex mode. Accordingly, at block 712, the MCD can notify the accessory to enter duplex mode and enable echo cancellation. In some embodiments, the notification at block 712 may also notify the accessory to enable noise reduction and/or any other audio processing that it is desirable for the accessory to perform when in duplex mode. At block 714, the accessory can respond to the notification by entering duplex mode and enabling echo cancellation (and/or other audio processing), while at block 716, the MCD disables its own internal echo cancellation (and/or any other audio processing that has been designated to be handled by the accessory when in duplex mode).

The MCD and accessory can proceed to operate in duplex mode (blocks 718, 720), with the MCD receiving an audio signal via the line-in path from the accessory while sending an audio signal via the line-out path to the accessory; conversely, the accessory can send an audio signal via the line-in path to the MCD while receiving an audio signal via the line-out path from the MCD. During duplex-mode operation, the accessory can apply echo cancellation and/or any other audio processing that has been designated to be handled by the accessory while in duplex mode.

While operating in duplex mode, the MCD can detect (block 722) that duplex mode operation should end. For instance, a phone call may be disconnected, or the user may exit an application program that uses duplex mode such as karaoke or mixing board applications. When duplex mode operation should end, the MCD can signal the accessory (block 724) to exit duplex mode and disable echo cancellation (and/or any other audio processing that the accessory performs only in duplex mode). At block 726, the accessory exits duplex mode. In one embodiment, when duplex mode is exited, the accessory can restore a simplex mode that it was operating in prior to entering duplex mode. Accordingly, the MCD and the accessory can return to the state depicted by blocks 706, 708. In an alternative embodiment, the MCD can signal the accessory to transition to a different audio state upon exiting duplex mode, depending on what activity is expected to occur next.

While the invention has been described with respect to specific embodiments, one skilled in the art will recognize that numerous modifications are possible. For instance, audio signals can include any signal that provides a representation of sound in any format, including analog or digital formats. Audio signals can represent sound information any encoding desired, provided that the mobile communication device and the accessory are equipped with appropriate hardware and/or software for encoding and decoding the audio signals. Further, audio signals referred to as line-in and line-out may include monaural, stereo, and multi-channel (e.g., so-called "5.1" or "7.1") signals. Audio signal paths can be wired and/or wireless (e.g., using a Bluetooth audio standard).

In addition, while certain embodiments make specific reference to echo cancellation, a variety of audio processing techniques can be cooperatively managed in the manner described herein. For example, noise reduction can be performed by the accessory or the MCD; in general, one application of noise reduction improves signal quality but two can degrade it. Thus, it can be helpful to coordinate noise reduction so that it is applied exactly once. In some embodiments, the device that has the microphone (e.g., the accessory in embodiments above) is selected to perform noise reduction while in duplex mode, as the device that has the microphone is likely to provide more optimal noise reduction. Other audio processing features such as gain control can also be designated to be applied by the device that has the microphone.

In some embodiments, an accessory can explicitly indicate (e.g., during identification) that it is operable as a speaker phone. In other embodiments, the mobile communication device can use any accessory as a speaker phone, provided that the accessory provides a minimum set of features to support speaker phone operation (e.g., line-in and line-out with duplex mode support and echo cancellation capability).

In some embodiments, circuits, processors, and/or other components of a mobile communication device and/or accessory may be configured to perform various operations described herein. Those skilled in the art will appreciate that, depending on implementation, such configuration can be accomplished through design, setup, interconnection, and/or programming of the particular components and that, again depending on implementation, a configured component might or might not be reconfigurable for a different operation. For example, a programmable processor can be configured by providing suitable executable code; a dedicated logic circuit can be configured by suitably connecting logic gates and other circuit elements; and so on. Further, while the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating some or all features described herein may be encoded on various computer readable storage media; suitable media include magnetic disk (including "hard" disk) or tape, optical storage media such as compact disk (CD) or DVD (digital versatile disk), flash memory, and the like. Computer readable storage media encoded with the program code may be packaged with a compatible device or provided separately from other devices. In addition, program code may be encoded and transmitted via wired optical, and/or wireless networks conforming to a variety of protocols, including the Internet, thereby allowing distribution, e.g., via Internet download.

Thus, although the invention has been described with respect to specific embodiments, it will be appreciated that the invention is intended to cover all modifications and equivalents within the scope of the following claims.

What is claimed is:

1. A method of operating an accessory, the method comprising:
   communicating, by the accessory to a mobile communication device, capabilities of the accessory, the capabilities including an option to provide an input audio signal to the mobile communication device through an audio input path concurrently with receiving an output audio signal from the mobile communication device through an audio output path;
   in response to receiving an initiation notification for a telephone call from the mobile communication device while concurrently receiving the output audio signal through the audio output path:
      enabling the audio input path by the accessory;
      receiving an input audio signal by the accessory from an input audio source; and
      delivering the input audio signal on the audio input path by the accessory; and
   in response to receiving a termination notification for the telephone call from the mobile communication device, disabling the audio input path by the accessory.

2. The method of claim 1, wherein the accessory comprises a microphone as the input audio source and a speaker.

3. The method of claim 1 further comprising processing the input audio signal before delivering it on the audio input line, wherein the processing includes at least one of echo cancellation and noise reduction.

4. The method of claim 3 further comprising ceasing processing of the input audio signal in response to receiving the termination notification.

5. The method of claim 1 further comprising:
   sending, by the accessory, a dialing instruction to the mobile communication device in response to detecting an initiation of the telephone call by the accessory, wherein the initiation notification is received when the dialing instruction is executed.

6. The method of claim 1 further comprising:
   sending, by the accessory, a termination instruction to the mobile communication device in response to detecting a termination of the telephone call by the accessory, wherein the termination notification is received when the termination instruction is executed.

7. A non-transitory computer-readable medium containing executable instructions that cause a processor of an accessory to perform operations comprising:
   signaling to a mobile communication device capability information for the accessory, the capability information indicating that the accessory is operable to provide an input audio signal to the mobile communication device through an audio input path concurrently with receiving an output audio signal from the mobile communication device through an audio output path;
   in response to receiving an initiation notification of a telephone call from the mobile communication device:
      enabling the audio output path and the audio input path to be concurrently active;
      configuring an audio section of the accessory to concurrently receive the output audio signal on the audio output path and the input audio signal from an input audio source; and
      further configuring the audio section to concurrently route the input audio signal on the audio input path and the output audio signal to an output; and
   in response to receiving a termination notification for the telephone call from the mobile communication device, disabling at least the audio input path.

8. The non-transitory computer readable medium of claim 7, wherein the audio section is further configured to process the input audio signal using at least one of echo cancellation and noise reduction.

9. The non-transitory computer readable medium of claim 8, wherein the operations further comprise configuring the audio section to cease processing the audio signal from the microphone in response to receiving the notification that the telephone call is terminating.

10. The non-transitory computer readable medium of claim 7, wherein the operations further comprise transmitting a dialing instruction to the mobile communication device in response to detecting an initiation of the telephone call by the accessory, wherein the initiation notification is received when the dialing instruction is executed.

11. The non-transitory computer readable medium of claim 7, wherein the operations further comprise transmitting a termination instruction to the mobile communication device in response to detecting a termination of the telephone call by the accessory, wherein the termination notification is received when the termination instruction is executed.

12. An accessory for use with mobile communication device, the accessory comprising:
   a controller configured to communicate capability information for the accessory to the mobile communication device, the capability information indicating that the accessory is operable to provide an input audio signal to the mobile communication device through an audio input path concurrently with receiving an output audio signal from the mobile communication device through an audio output path;
   an input/output (I/O) interface configured to communicate with the mobile communication device, the I/O interface including the audio-in signal path to send the input audio signal, the audio-out signal path to receive the output audio signal, and a control signal path to receive initiation and termination notifications for telephone calls from the mobile communication device; and
   an audio processing section coupled to the I/O interface and configured to receive an output audio signal from the mobile communication device on the audio-out signal path and to send the input audio signal to the mobile communication device on the audio-in signal path, wherein the audio processing section is further configured to concurrently enable the audio-in and audio-out signal paths in response to receiving an initiation notification and to disable the audio-in signal path in response to receiving a termination notification.

13. The accessory of claim 12, wherein the I/O interface is further configured to communicate capability information to the mobile communication device including a capability to concurrently enable the audio-in and audio-out signal paths.

14. The accessory of claim 12, wherein the audio processing section is further configured to process the input audio signal using at least one of echo cancellation and noise reduction processing.

15. The accessory of claim 14, wherein the audio processing section is further configured to cease the audio processing in response to receiving the termination notification.

16. The accessory of claim 12 further comprising a user-operable input control, wherein the I/O interface is further configured to signal to the mobile communication device when a telephone call is initiated by the user-operable input control and when a phone call is terminated by the user-operable input control, and wherein the initiation and termination notifications are received in response to the signaling.

* * * * *